United States Patent Office 3,091,631
Patented May 28, 1963

3,091,631
PRODUCTION OF ACETYLENIC CAROTENOID ALDEHYDES AND ACETAL INTERMEDIATES THEREFOR
Otto Isler, Basel, Herbert Lindlar, Reinach, Basel-Land, Marc Montavon, Basel, Rudolf Rüegg, Bottmingen, and Ulrich Schwieter, Basel, Switzerland, and Gabriel Saucy, Nutley, N.J., assignors to Hoffmann-La Roche Inc., Nutley, N.J., a corporation of New Jersey
No Drawing. Filed Aug. 15, 1960, Ser. No. 49,409
Claims priority, application Switzerland Oct. 18, 1957
27 Claims. (Cl. 260—476)

This invention relates to acetylenic aldehydes and to methods for synthesizing such compounds. More particularly the invention relates to acetylenic aldehydes which may be represented by the structural formula

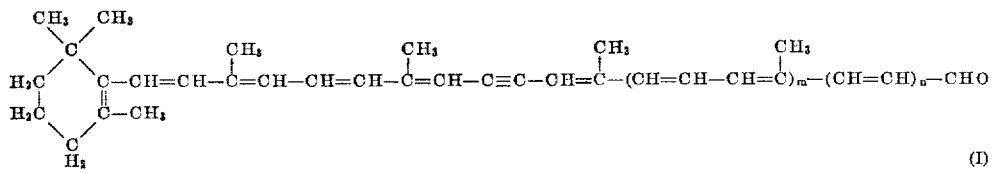

(I)

wherein $m$ represents an integer from 0 to 3 and $n$ represents an integer from 0 to 1.

The acetylenic aldehydes described above may be derived by several methods. They may be obtained from an esterified or etherified acetylene diol, namely, 1-acyloxy - 13 - (2,6,6-trimethyl-1-cyclohexen- 1- yl)-2,7,11-trimethyl-1,7,9,11-tridecatetraen-4-yn-3,6-diol or 1-alkoxy-13 - (2,6,6-trimethyl-1-cyclohexen-1-yl)-2,7,11-trimethyl-1,7,9,11-tridecatetraen-4-yn-3,6-diol, respectively, or from an acetylenic acetal, namely, 1,1-dialkoxy-13-(2,6,6-trimethyl - 1-cyclohexen-1-yl)-2,7,11-trimethyl-6-hydroxy-2,7,9,11-tridecatetraen-4-yne. Briefly, an acetylenic ester, ether or acetal of the group described above is treated with acid to obtain the aldehyde of Formula I above wherein $m$ and $n$ are both zero. Then, by a series of reactions described in detail below, additional aldehydes having the above formula are obtained in sequence.

The method comprises treating either 1-acyloxy-13-(2, 6,6 - trimethyl - 1-cyclohexen-1-yl)-2,7,11-trimethyl-1,7, 9,11 - tridecatetraen-4-yn-3,6-diol, 1-alkoxy-13-(2,6,6-trimethyl - 1-cyclohexen-1-yl)-2,7,11-trimethyl-1,7,9,11-tridecatetraen-4-yn-3,6-diol or 1,1 - dialkoxy - 13-(2,6,6-trimethyl - 1 - cyclohexen-1-yl)-2,7,11-trimethyl-6-hydroxy-2,7,9-11-tridecatetraen-4-yne with aqueous or anhydrous acid, preferably in an inert solvent. This effects a rearrangement and a molecule of water and a molecule of acid or alcohol, as the case may be, are simultaneously split off so that 13-(2,6,6-trimethyl-1-cyclohexen-1-yl)-2, 7,11 - trimethyl-2,6,8,10,12-tridecapentaen-4-yn-1-al [Formula I, $m=0$, $n=0$] results. From this aldehyde the other acetylenic aldehydes of Formula I may be obtained in turn by a sequence of three steps: acetalizing the aldehyde group by means of a lower alkyl acetalizing agent, condensing the acetal of alternate compounds thus obtained with a vinyl ether and a propenyl ether, respectively, then treating with acid. Thus from 13-(2,6,6-trimethyl - 1 - cyclohexen - 1 - yl) - 2,7,11-trimethyl-2,6,8,10,12-tridecapentaen-4-yn-1-al, there is obtained by acetalizing, condensing the acetal with a vinyl ether and acidifying, 15 - (2,6,6 - trimethyl-1-cyclohexen-1-yl)-4,9,13-trimethyl-2,4,8,10,12,14-pentadecahexaen-6-yn-1-al. The last named compound, after acetalizing, condensing with a propenyl ether and acidifying, yields 17-(2,6,6-trimethyl-1-cyclohexen-1-yl)-2,6,11,15 - tetramethyl - 2,4,6,10,12,14, 16-heptadecaheptaen-8-yn-1-al. Acetalizing the latter, condensing the acetal with a vinyl ether and acidifying produces 19-(2,6,6-trimethyl-1-cyclohexen-1-yl)-4,8,13,17-tetramethyl - 2,4,6,8,12,14,16,18-nonadecaoctaen-10-yn-1-al. By the same series of reactions involving a condensation with a propenyl ether, 21-(2,6,6-trimethyl-1-cyclohexen - 1 - yl)-2,6,10,15,19-pentamethyl-2,4,6,8,10,14,16, 18,20-heneicosanonaen-12-yn-1-al is obtained from the foregoing aldehyde. Next is obtained by the same series of reactions including a condensation with a vinyl ether 12-(2,6,6-trimethyl-1-cyclohexen-1-yl) - 4,8,12,17,21-pentamethyl - 2,4,6,8,10,12,16,18,20,22-tricosadecaen-14-yn-1-al. Then the latter yields, by the same reactions including a condensation with a propenyl ether, 25-(2,6,6-trimethyl - 1-cyclohexen-1-yl)-2,6,10,14,19,23-hexamethyl-2,4,6,8,10,12,14,18,20,22,24 - pentacosaundecaen-16-yn-1-al.

As noted above, in the first step of the overall process the acetylenic ester, ether or acetal, 1-acyloxy-13-(2,6,6-trimethyl - 1 - cyclohexen-1-yl)-2,7,11-trimethyl-1,7,9,11-tridecatetraen-4-pn-3,6,diol, 1-alkoxy-12-(2,6,6-trimethyl 1 - cyclohexen - 1-yl)-2,7,11-trimethyl-1,7,9,11-tridecatetraen-4-yn-3,6-diol or 1,1-dialkoxy-13-(2,6,6-trimethyl-1-cyclohexen - 1 - yl)-2,7,11-trimethyl-6-hydroxy-2,7,9,11-tridecatetraen-4-yne, is treated with acid so that rearrangement occurs with the simultaneous removal of one molecule of water and one molecule of acid or alcohol and 13 - (2,6,6-trimethyl-1-cyclohexen-1-yl)-2,7,11-trimethyl-2,6,8,10,12-tridecapentaen-4-yn-1-al is obtained. The reaction is preferably carried out in an inert organic solvent, such as acetone, alcohol or ether, in the presence of an aqueous or anhydrous acid, e.g. an organic acid such as an alkanoic acid like acetic acid, an arylsulfonic acid like p-toluenesulfonic acid, or an inorganic acid such as a mineral acid like hydrochloric acid, etc. The aldehyde obtained in this manner is a crystalline compound which shows a characteristic absorption maximum in the U.V. spectrum at 402–404 m$\mu$ in petroleum ether. In the subsequent steps of the overall process, when one acetylenic aldehyde is converted to a longer chain acetylenic aldehyde, the acetalization is effected by reaction of the aldehyde with an orthoformic acid alkyl ester, preferably an orthoformic acid lower alkyl ester, in the presence of an acid catalyst, such as phosphoric acid or p-toluenesulfonic acid. The acetals formed by this treatment are new compounds also and are within the scope of the invention.

These acetals, which are produced as intermediates, answer to the structural formula:

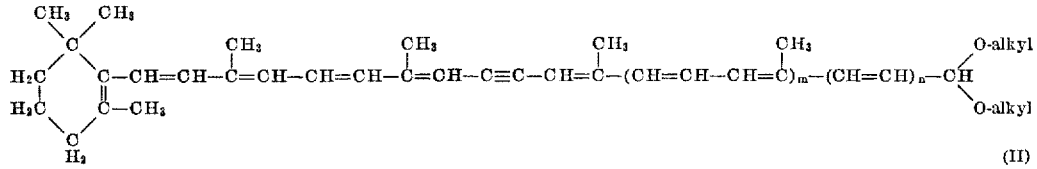

(II)

wherein $m$ and $n$ have the same significance as in Formula I.

The acetals are condensed with about an equimolecular proportion of a vinyl ether, for example, a vinyl lower alkyl ether such as vinyl ethyl ether, or a propenyl ether, for example, a propenyl lower alkyl ether such as propenyl ethyl ether. The 25, 30 and 35 carbon atom acetals are condensed with a vinyl ether and the 27, 32 and 37 carbon atoms acetals are condensed with a propenyl ether. The condensation may be effected in an inert solvent such as benzene, ether or petroleum ether. An acid catalyst, e.g. a metal halide condensation agent such as zinc chloride, boron trifluoride etherate, etc., may be introduced. The condensation product which is an ether-acetal, may be used in the next step without isolation, if desired.

Upon treatment of the condensation product with acid, hydrolysis occurs and alcohol is simultaneously split off so that the desired acetylenic aldehyde is formed. The acids which may be used for this step include aqueous organic or inorganic acids such as acetic acid, p-toluenesulfonic acid, hydrohalic acids, etc. Instead of an acid, an acid reacting salt such as zinc chloride, sodium bisulfate, etc., may also be used. The alcohol formed as a byproduct of the reaction with acid is preferably continuously separated from the reaction mixture.

The sequence of steps described above may be repeated as many times as desired in order to obtain any of the series of $C_{25}$ and up acetylenic aldehydes of Formula I.

The esterified or etherified acetylene diols and the acetylenic acetal, i.e. 1 - acyloxy-13-(2,6,6-trimethyl-1-cyclohexen-1-yl) - 2,7,11 - trimethyl-1,7,9,11-tridecatetraen-4-yn-3,6-diol, 1 - alkoxy - 13 - (2,6,6-trimethyl-1-cyclohexen-1-yl)-2,7,11-trimethyl - 1,7,9,11 - tridecatetraen-4-yn - 3,6-diol- and 1,1-dialkoxy - 13 - (2,6,6-trimethyl-1-cyclohexen-1-yl)-2,7,11-trimethyl - 6 - hydroxy-2,7,9,11-tridecatetraen-4-yne, are novel compounds. The methods for preparing these substances, as well as the novel intermediates therefor, are also features of this invention.

1-acyloxy-13-(2,6,6-trimethyl - 1 - cyclohexen-1-yl)-2,7,11-trimethyl,1,7,9,11 - tridecatetraen - 4 - yn-3,6-diol or 1-alkoxy-13-(2,6,6-trimethyl - 1 - cyclohexen-1-yl)-2,7,11 - trimethyl - 1,7,9,11 - tridecatetraen-4-yn-3,6-diol may be produced by reacting acetylene with 8-(2,6,6-trimethyl-1-cyclohexen - 1 - yl)-2,6-dimethyl-2,4,6-octatrien-1-al by means of a metallo organic reaction to obtain 10-(2,6,6-trimethyl-1-cyclohexen-1-yl)-4,8-dimethyl-4,6,8-decatrien-1-yn-3-ol, then reacting the latter, also by means of a metallo organic reaction, with 3-acyloxy-2-methyl - 2 - propen-1-al or with 3-alkoxy-2-methyl-2-propen-1-al.

The first metallo organic reaction mentioned above may be effected by reacting acetylene in liquid ammonia with an alkali metal, e.g. lithium, or alkaline earth metal, e.g. magnesium, to form an alkali metal- or alkaline earth metal acetylide which is immediately reacted with the aldehyde. The condensation product formed is hydrolyzed to 10-(2,6,6-trimethyl-1-cyclohexen-1-yl) - 4,8 - dimethyl-4,6,8-decatrien-1-yn-3-ol. The condensation in liquid ammonia may be carried out under increased pressure at room temperature or under normal pressure at the boiling temperature of the ammonia. The aldehyde is advantageously condensed with lithium acetylide, which may be produced from lithium metal and acetylene in the same vessel and in the same ammonia to be used in the condensation reaction. The aldehyde may be added in an inert solvent, for example ether. The hydrolysis of the condensation product occurs in liquid ammonia upon the addition of an ammonium salt or by removing the ammonia by treatment with acid. The acetylene carbinol obtained is a viscous oil with U.V. absorption maxima at 280–281 and 291 m$\mu$ in petroleum ether. In a Zerewitinoff determination one mol of active hydrogen is indicated in the cold and two mols in the warm.

The condensation of the acetylene carbinol with the 3-acyloxy- or 3-alkoxy-2-methyl-2-propen-1-al is also effected by means of a metallo organic reaction. For example, the acetylene carbinol, in an inert solvent, is treated with two mols of alkyl magnesium halide or two mols of phenyl lithium. The first mol is tied up by the hydroxyl group while the second mol reacts with the acetylene linkage and makes the resulting hydrogen atom reactive. The di-magnesium halide compound or di-lithium compound formed is then converted in the same solvent with the 3-acyloxy- or 3-alkoxy-2-methyl-2-propen-1-al. Preferably, the acetylene carbinol is treated in a solvent such as ether with two mols of alkyl magnesium halide and the di-magnesium halide compound formed is condensed without isolation and purification with one mol of 3-acyloxy- or 3-alkoxy-2-methyl-2-propen-1-al. The condensation product is preferably hydrolyzed in conventional manner without purification, for example by pouring it into a mixture of ice and dilute acetic acid or dilute ammonium chloride solution, whereupon the acetylene diol is obtained as a viscous oil which may be characterized by U.V. absorption spectrum and Zerewitinoff determination. It is preferably used directly without further purification.

1 - alkoxy-13-(2,6,6-trimethyl-1-cyclohexen - 1 - yl)-2,7,11-trimethyl-1,7,9,11-tridecatetraen-4 - yn - 3,6 - diol may also be produced by reacting acetylene with 3-alkoxy-2-methyl-2-propen-1-al, then reacting the product with 8-(2,6,6-trimethyl-1-cyclohexen - 1 - yl)-2,6-dimethyl-2,4,6-octatrien-1-al by means of a metallo organic reaction as described above.

1,1-dialkoxy-13-(2,6,6-trimethyl-1-cyclohexen - 1 - yl)-2,7,11-trimethyl-6-hydroxy - 2,7,9,11 - tridecatetraen-4-yne may be produced by condensing 1,1 - dialkoxy-2-methyl-2-penten-4-yne with 8 - (2,6,6-trimethyl-1-cyclohexen-1-yl)-2,6-dimethyl - 2,4,6 - octatrien-1-al by means of a metallo organic reaction and treating the condensation product with acid in the same manner as described above. For example, the dialkoxypentene is treated in a solvent such as ether with a slight excess of alkyl magnesium halide. The metal halide reaction product formed is then treated with the aldehyde, preferably in the same solvent without isolation. The condensation product of the reaction with the aldehyde is preferably hydrolyzed in conventional manner without purification, for example, by pouring it into a mixture of ice and dilute acetic acid or dilute ammonium salt solution, e.g. ammonium chloride. The acetal thus obtained may be used directly without further purification, if desired.

The 3-acyloxy-2-methyl-2-propen-1-al used in the above described reactions may be produced by neutralizing free methylmalonaldehyde with one equivalent of sodium hydroxide. The sodium salt thus obtained may be suspended in an inert solvent such as methylene chloride and reacted with an acid chloride such as benzoyl chloride or acetyl chloride. The 3-acyloxy-2-methyl-2-propen-1-al may be isolated by filtering off the sodium chloride formed, concentrating the filtrate and purifying the residue by distillation or crystallization.

The 3-alkoxy-2-methyl-2-propen-1-al may be produced according to the following method. An orthoformic acid lower alkyl ester, e.g. orthoformic acid ethyl ester, is condensed with a propenyl lower alkyl ether, e.g. propenyl ethyl ether, in the presence of boron trifluoride etherate which results in a 1,1,3,3-tetraalkoxy-2-methylpropane, e.g. 1,1,3,3-tetraethoxy-2-methylpropane (B.P. 93° C./10 mm.; $n_D^{20}=1.4132$) if orthoformic acid ethyl ester and propenyl ethyl ether are used. The 1,1,3,3-tetraalkoxy-2-methylpropane is partially hydrolyzed by treatment with a molar proportion of water in the presence of a small amount of a strong acid, e.g. a mineral acid such as sulfuric acid or an arylsulfonic acid such as p-toluenesulfonic acid, at a temperature ranging from about room temperature to about 70° C., to obtain 3-alkoxy-2-methyl-2-propen-1-al.

To obtain 1,1-dialkoxy-2-methyl-2-penten-4-yne, 3-alkoxy-2-methyl-2-propen-1-al, described above, is condensed with acetylene in a metallo organic reaction, e.g. the aldehyde is reacted with an alkali metal or alkaline earth metal derivative of acetylene in liquid ammonia. The aldehyde may be added in an inert solvent such as ether. Hydrolysis of the reaction product in aqueous ammonia, preferably by the addition of an ammonium salt, results in the production of 1-alkoxy-2-methyl-3-hydroxy-1-penten-4-yne. This product is then treated with an orthoformic acid alkyl ester such as orthoformic acid ethyl ester, in the presence of an acid condensation agent such as a mineral acid or arylsulfonic acid, preferably a mixture of phosphoric acid and p-toluenesulfonic acid, to obtain the 1,1-dialkoxy-2-methyl-2-penten-4-yne.

In the various compounds referred to above, the term "alkyl" refers to straight chain and branched chain aliphatic hydrocarbon groups. Within that class, lower alkyl groups such as methyl, ethyl, propyl, isopropyl, butyl, isobutyl and the like are preferred. The term "acyl" refers to the acid group obtained from alkanoic acids or aralkanoic acids upon removal of the hydroxy group. Preferred are the group from lower alkanoic acids, e.g. acetyl, propionyl, isopropionyl, butyryl, isobutyryl, and the like, as well as phenyl lower alkanoyl groups such as benzoyl, phenacetyl and the like.

The acetylenic aldehydes of this invention are useful as color imparting agents. They may be used to impart a yellow-to-red color in foodstuff as well as poultry feed additives for promoting better coloring in skin, shanks and egg yolks. In addition, they are useful as intermediates for the production of other synthetic pigments, such as apo-2-carotenal or torularhodine. The other compounds are useful as intermediates for the preparation of the acetylenic aldehyde pigments as shown in the specification.

Four new unsaturated aldehydes—19-(2,6,6-trimethyl-1-cyclohexen-1-yl)-4,8,13,17-tetramethyl-2,4,6,8,10,12,14,16,18-nonadecanonaen-1-al, 21 - (2,6,6-trimethyl-1-cyclohexen-1-yl) - 2,6,10,15,19 - pentamethyl-2,4,6,8,10,12,14,16,18,20 - heneicosadecaen-1-al, 23 - (2,6,6-trimethyl-1-cyclohexen-1-yl)-4,8,12,17,21-pentamethyl - 2,4,6,8,10,12,14,16,18,20,22-tricosaundecaen-1-al and 25-(2,6,6-trimethyl-1-cyclohexen-1-yl)-2,6,10,14,19,23-hexamethyl - 2,4,6,8,10,12,14,16,18,20,22,24-pentacosadodecaen-1-al- may be produced by selectively hydrogenating a corresponding aldehyde having the same number of carbons and one triple bond replacing a double bond, namely—19-(2,6,6-trimethyl-1-cyclohexen-1-yl) - 4,8,13,17 - tetramethyl-2,4,6,8,12,14,16,18-nonadecaoctaen-10-yn-1-al, 21 - (2,6,6-trimethyl-1-cyclohexen-1-yl) - 2,6,10,15,19 - pentamethyl-2,4,6,8,10,14,16,18,20-heneicosanonaen-12-yn-1-al, 23 - (2,6,6-trimethyl-1-cyclohexen-1-yl) - 4,8,12,17,21 - pentamethyl-2,4,6,8,10,12,16,18,20,22-tricosadecaen-14-yn - 1-al and 25 - (2,6,6-trimethyl-1-cyclohexen-1-yl) - 2,6,10,14,19,23 - hexamethyl - 2,4,6,8,10,12,14,18,20,22,24 - pentacosaundecaen-16-yn-1-al, respectively. The reduction is effected in the presence of a catalyst which selectively reduces only the triple bond to a double bond. Such a catalyst is, for example, a lead and quinoline deactivated palladium-calcium-carbonate catalyst.

The reduction may be carried out in a hydrogen atmosphere under normal pressure and in an inert solvent such as petroleum ether. Best results are obtained when more than an equimolecular proportion of hydrogen is used, that is, approximately 1.3 to 1.6 moles of hydrogen for each mol of aldehyde is used. Preferably, the hydrogenation is continued until the reaction comes to a halt. It is also preferable to subject to the hydrogenation starting aldehydes which are in rather pure form.

The selective hydrogenation generally results in unsaturated aldehydes with cis-configuration. To convert them to the corresponding all-trans aldehydes, the product of the selective hydrogenation may be isomerized under mild conditions, e.g. by heating or under the influence of light. The unsaturated isomeric cis and trans aldehydes are all within the scope of this invention.

These aldehydes are red to violet colored substances. Because they provide a graded color scale and also because of their vitamin A activity, they are particularly useful for coloring food stuffs. They are also useful for the synthesis of known valuable members of the carotenoid series, e.g. torularhodine.

The following examples are illustrative of the invention. All temperatures are expressed in degrees centigrade.

*Example 1*

In a stirring flask 620 cc. of ethyl orthoformate were mixed with 1.6 cc. of boron trifluoride etherate and the mixture was heated to 30°. Into this warm mixture was dropped a mixture of 520 cc. propenyl ethyl ether and 620 cc. of ethyl orthoformate. The exothermic reaction was maintained at a temperature between 30° and 40° adjusting the rate of dropping and, if necessary, by external cooling. After completion of the reaction the solution was washed with aqueous sodium bicarbonate solution, dried with sodium sulfate and subjected to fractional distillation. The excess ethyl orthoformate initially added was obtained as a fore-run. The resulting 1,1,3,3-tetraethoxy-2-methylpropane boiled at 93–95°/10 mm.; $n_D^{20°}=1.4132$. 468 g. of 1,1,3,3-tetraethoxy-2-methylpropane were heated for 6 hours at 40° together with 528 cc. of water and 53 cc. of 3 N sulfuric acid. A small amount of phenolphthalein was added to the cooled mixture, and then 4 N aqueous caustic soda solution was added until the red color persisted. The reaction mixture was concentrated to dryness in vacuo at 55°, and the residue was recrystallized from ethanol. There were thus obtained 70% of the sodium salt of 3-hydroxy-2-methyl-2-propen-1-al. 54 g. of this sodium salt were suspended in 250 cc. of methylene chloride, and to the suspension were then added while stirring 60 cc. of benzoyl chloride. After refluxing for two hours, the precipitated sodium chloride was separated and the filtrate was concentrated to 120 cc. To the concentrate were added, while agitating, 1200 cc. of low-boiling petroleum ether, and the precipitation was completed by cooling. After filtering and drying there were obtained 80% of 3-benzoyloxy-2-methyl-2-propen-1-al of M.P. 79–80°.

Dry, acetone-free acetylene was introduced into a solution of 1.9 g. of lithium in 900 cc. of liquid ammonia until complete conversion occurred. A solution of 61.2 g. of 8-(2,6,6-trimethyl-1-cyclohexen-1-yl)-2,6-dimethyl-2,4,6-octatrien-1-al in 200 cc. of dry ether was added with vigorous stirring over a 20 minute period. The reaction mixture was stirred vigorously for 20 hours with the exclusion of moisture. 35 g. of ammonium chloride were then added in small portions and the ammonia was permitted to evaporate. 260 cc. of water were added and the mixture was permitted to stratify. The ether layer was separated, washed with water, dried with sodium sulfate and concentrated in vacuo. The remaining reddish oil was strongly dried in vacuo. The 10 - (2,6,6 - trimethyl - 1 - cyclohexen - 1 - yl) - 4,8-dimethyl-4,6,8-decatrien-1-yn-3-ol (U.V. absorption maxima at 280.5 and 291 mμ in petroleum ether) thus obtained was dissolved in 200 cc. of absolute ether and added gradually with stirring at 15 to 20° to an ethyl magnesium bromide solution (prepared from 12.3 g. magnesium and 67 g. ethyl bromide in 200 cc. absolute ether). The mixture was then heated in a nitrogen atmosphere for one hour under reflux, cooled with ice water and diluted with 200 cc. of dry methylene chloride. A solution of 42 g. 3-benzoyloxy-2-methyl-2-propen-1-al in 200 cc. of methylene chloride was quickly poured in. The mixture was stirred for an additional two hours while cooling with ice. The reaction mixture was then poured into ice cold dilute acetic acid and permitted to stratify. The organic layer was separated, washed with water, dried with sodium sulfate and the solvent was evaporated in vacuo at 30°. Crude 13-(2,6,6-trimethyl-1-cyclohexen - 1 - yl) - 2,7,11 - trimethyl - 1 - benzoyloxy-1,7,9,11-tridecatetraen-4-yn-3,6-diol was obtained as a yellow viscous oil which was used directly in the next step without further purification.

The oil was dissolved in 700 cc. isopropanol, treated with 5 cc. of glacial acetic acid and boiled for three hours in a nitrogen atmosphere. After diluting with water, the reaction product was extracted with ether, washed with dilute sodium bicarbonate solution and dried with sodium sulfate. The ether was then evaporated in vacuo. The crude 13(2,6,6-trimethyl-1-cyclohexen-1-yl)-2,7,11-trimethyl-2,6,8,10,12-tridecapentaen-4-yn-1-al thus obtained was crystallized from petroleum ether (boiling range 80–100°) forming yellow leaflets, M.P. 82–83°; U.V. absorption maximum at 402–404 m$\mu$ ($E_1^1$=1790) in petroleum ether solution.

Example 2

2340 g. of 1,1,3,3-tetraethoxy-2-methylpropane obtained as described in Example 1 were treated with a solution containing 5.4 g. of p-toluenesulfonic acid in 180 g. of water. The mixture was stirred at 80° until the aqueous phase disappeared. The solution was permitted to stand at 80° for 20 hours, then cooled. 50 g. of solid sodium bicarbonate were added and the mixture was stirred for two hours at room temperature. The mixture was filtered, the filtrate was washed with a small amount of absolute ethanol and then fractionated under water vacuum. After evaporation of the alcohol and a forerun comprising about 115 g., there was obtained a principal fraction comprising 3-ethoxy-2-methyl-2-propen-1-al, B.P. 78–81°/14 mm.; $n_D^{22}$=1.4738; U.V. absorption maximum at 242 m$\mu$ (in petroleum ether).

A solution of sodium acetylide in 2.5 l. of liquid ammonia was prepared from 50 g. of sodium by the procedure described in Example 1. Into this solution, 228 g. of 3-ethoxy-2-methyl-2-propen-1-al were dropped over the course of an hour. The material was rinsed out with 10 cc. of absolute ether and the mixture was permitted to react for 10 to 15 hours at the boiling temperature of ammonia. The reaction mixture was carefully treated with 100 g. of ammonium chloride and the ammonia was replaced with ether. The resulting solution was washed with water, dried with sodium sulfate and the solvent was evaporated at 50° in vacuo. 1-ethoxy-2-methyl-3-hydroxy-1-penten-4-yne was obtained as a yellow oil which was purified by distillation, B.P. 63°/0.05 mm.; $n_D^{20}$=1.4784.

275 g. of 1-ethoxy-2-methyl-3-hydroxy-1-penten-4-yne were dissolved in a solution of 296 g. of orthoformic acid ethyl ester in 150 cc. of absolute ethanol. The solution was stirred for two hours at 20–25° with a solution of 5 cc. of phosphoric acid and 0.5 g. of p-toluenesulfonic acid in 150 cc. of absolute ethanol with the exclusion of moisture. The mixture was permitted to stand at room temperature overnight, 15 cc. of pyridine were then added with stirring and the mixture was poured into an ice cold solution of sodium bicarbonate. After extraction with petroleum ether (boiling range 40–45°), washing three times with sodium bicarbonate solution, drying with sodium sulfate and potassium carbonate, and concentration in vacuo at 45°, crude 1,1-diethoxy-2-methyl-2-penten-4-yne was obtained as a brown oil. Upon distillation of the latter under nitrogen, a colorless liquid was obtained, B.P. 45–46°/0.1 mm.; $n_D^{20}$=1.4520–1.4540; U.V. absorption maximum at 225 m$\mu$ (in alcohol).

A solution of ethyl magnesium bromide was prepared by reacting, while cooling with ice, 2.7 g. magnesium and 14 g. ethyl bromide in 30 cc. of absolute ether. Over a period of 30 minutes a solution of 16.8 g. of 1,1-diethoxy-2-methyl-2-penten-4-yne in 30 cc. of absolute benzene were dropped into the ethyl magnesium bromide solution with vigorous stirring as the reaction solution continuously boiled slowly. The Grignard compound separated partially in granular form and partially in the form of a viscous liquid. The mixture was refluxed for another 30 minutes and then, while cooling with water, a solution of 22 g. 8-(2,6,6-trimethyl-1-cyclohexen-1-yl)-2,6-dimethyl-2,4,6-octatrien-1-al in 50 cc. of absolute ether were dropped in over a period of 30 minutes until only a small undissolved portion remained in a clear yellow solution. The mixture was stirred for an additional 3 hours at room temperature and then the reaction solution was poured into a mixture of 20 g. of ammonium chloride and ice. The crude product, 1,1-diethoxy-13-(2,6,6-trimethyl-1-cyclohexen-1-yl)-2,7,11 - trimethyl-6-hydroxy-2,7,9,11-tridecatetraen-4-yne, was extracted with ether, washed with water, dried over sodium sulfate and evaporated in vacuo at 45°. The product was a viscous liquid, U.V. absorption maximum at 281 m$\mu$ (in petroleum ether).

The condensation product obtained above was dissolved in 200 cc. of ether and, after the addition of 20 cc. of alcoholic HCl, was permitted to stand overnight at room temperature. The resulting solution was washed first with sodium bicarbonate solution and then with water. It was dried over sodium sulfate and concentrated in vacuo at 45°. There was obtained a viscous, strongly yellow colored oil. The oil was dissolved in 150 cc. of petroleum ether (boiling range 30–45°), seeded and permitted to stand for several hours at −10°. The precipitated crystalline slurry was filtered under suction and washed several times with cold petroleum ether. It was dried in vacuo at 30°. The 13-(2,6,6-trimethyl-1-cyclohexen-1-yl)-2,7,11-trimethyl-2,6,8,10,12 - tridecapentaen-4-yn-1-al was obtained as an ocher colored powder M.P. 82–83°; U.V. absorption maximum at 400 m$\mu$ (in petroleum ether).

Example 3

40 g. of 10-(2,6,6-trimethyl-1-cyclohexen-1-yl)-4,8-dimethyl-4,6,8-decatrien-1-yn-3-ol were reacted with a solution of ethyl magnesium bromide as described in Example 1. To the cooled Grignard solution was added a solution of 18 g. of 3-isopropoxy-2-methyl-2-propen-1-al in 10 cc. of absolute ether and stirred in a nitrogen atmosphere for 2 hours at 0 to 5°. Then the reaction mixture was poured into a saturated solution of ammonium chloride and the reaction product was obtained as described in Example 4.

62 g. of the crude 13-(2,6,6-trimethyl-1-cyclohexen-1-yl)-2,7,11-trimethyl-1-isopropoxy-1,7,9,11-tridecatetraen-4-yn-3,6-diol obtained as described above were dissolved in 50 cc. acetone. After the addition of a solution of 6 g. of p-toluenesulfonic acid in 60 cc. of water, it was boiled for 1½ hours in a nitrogen atmosphere. The 13-(2,6,6-trimethyl-1-cyclohexen-1-yl)-2,7,11-trimethyl - 2,6,8,10,12-tridecapentaen-4-yn-1-al was separated and purified as in Example 4, M.P. 82–83°, U.V. absorption maximum at 402–404 m$\mu$ in petroleum ether.

Example 4

3-isopropoxy-2-methyl-2 - propen - 1 - al was produced from 1,1,3,3-tetraisopropoxy-2-methylpropane according to the procedure at the beginning of Example 2.

To a solution of lithium acetylide in liquid ammonia (prepared from 1.5 g. of lithium according to the procedure in Example 1) was added a solution of 25 g. 3-isopropoxy-2-methyl-2-propen-1-al in 50 cc. absolute ether and the mixture was vigorously stirred for 18 hours at the boiling temperature of the ammonia. 35 g. of ammonium chloride were added in portions and the ammonia was permitted to distill off. After the addition of 200 cc. water, the mixture was extracted with ether. The ether solution was washed with water, dried with sodium sulfate and concentrated in vacuo. 1-isopropoxy-2-methyl-3-hydroxy-1-penten-4-yne was obtained as a yellow oil that was used further without purification. (The Zerewitinoff determination showed 0.96 mol of active hydrogen atoms in the cold and 1.91 mols of active hydrogen atoms in the warm.) The product was dissolved in 200 cc. absolute ether and gradually added to a solution of ethyl magnesium bromide (produced from 9.5 g. magnesium and 50 g. ethyl bromide in 200 cc. of absolute ether) while stirring at 15–20°. The mixture was refluxed for one hour under a nitrogen atmosphere and cooled with ice water. Then a solution of 51 g. of 8-(2,6,6-trimethyl-1-cyclohexen-1-yl)-2,6-dimethyl - 2,4,6-octatrien-1-al in 400 cc. of absolute ether was added and the mixture was stirred for 2 hours in a nitrogen atmosphere. The reaction solution was poured into ice cold ammonium chloride solution and permitted to stratify. The ether layer was separated, washed with saturated ammonium chloride solution and dried with sodium sulfate. The thus obtained solution of 13-(2,6,6-trimethyl-1-cyclohexen-1-yl)-2,7,11-trimethyl-1-isopropoxy-1,7,9,11-tridecatetraen-4-yn-3,6-diol was treated with 160 cc. of 12% alcoholic hydrogen chloride and permitted to stand for 16 hours at room temperature. The solution was washed with water and with 5% sodium bicarbonate solution, dried with sodium sulfate and concentrated in vacuo. The crude product thus obtained, 13-(2,6,6-trimethyl-1-cyclohexen-1-yl)-2,7,11-trimethyl-2,6,8,10,12 - tridecapentaen-4-yn-1-al, crystallized from alcohol in the form of yellow leaflets, M.P. 82–83°, U.V. absorption maximum at 402–404 m$\mu$, ($E_1^1$=1770) in petroleum ether.

*Example 5*

18 g. 13 - (2,6,6 - trimethyl-1-cyclohexen-1-yl)-2,7,11-trimethyl-2,6,8,10,12-tridecapentaen-4-yn-1-al were suspended in 17 cc. orthoformic acid ethyl ester, treated with a solution of 0.24 cc. phosphoric acid and a trace of p-toluenesulfonic acid in 8 cc. of absolute alcohol and stirred for several hours at room temperature. When everything was dissolved, the solution was permitted to stand for another 15 hours, 1.5 cc. of pyridine were added with ice cooling and then 50 cc. of 5% sodium bicarbonate solution. The mixture was then extracted with petroleum ether. The extract was washed with water, dried with sodium sulfate and evaporated in vacuo. The residue was dried under a high vacuum at 60°. 1,1-diethoxy - 13 - (2,6,6 - trimethyl-1-cyclohexen-1-yl)-2,7,11-trimethyl-2,6,8,10,12-tridecapentaen-4-yne was thus obtained as a yellow oil; U.V. absorption maxima at 366 and 380 m$\mu$ in petroleum ether. This compound was treated with 4 cc. of 10% zinc chloride solution in ethyl acetate and then dropwise with 4.27 g. vinyl ethyl ether while stirring at 30–35°. The reaction mixture was permitted to stand for 15 hours. To the 1,1,3-triethoxy-15-(2,6,6 - trimethyl - 1 - cyclohexen-1-yl)-4,9,13-trimethyl-4,8,10,12,14-pentadecapentaen-6-yne obtained as the product of the reaction was added a solution of 5 g. of sodium acetate in 50 cc. of 95% acetic acid. The mixture was heated with vigorous stirring in a nitrogen atmosphere for 4 hours at 95–100° whereupon the ethyl acetate formed distilled off slowly. The reaction mixture was permitted to cool with stirring. The reaction product, 15-(2,6,6-trimethyl - 1 - cyclohexen - 1-yl)-4,9,13-trimethyl-2,4,8,10,12,14-pentadecahexaen-6-yn-1-al, crystallized, was filtered off, washed with water and recrystallized from petroleum ether. The orange-red leaflets melted at 122°; U.V. absorption maximum at 417–418 m$\mu$ in petroleum ether.

*Example 6*

18 g. of 15-(2,6,6-trimethyl-1-cyclohexen-1-yl)-4,9,13-trimethyl - 2-4,8,10,12,14-pentadecahexaen-6-yn-1-al were acetalized with orthoformic acid ethyl ester in the presence of phosphoric acid and p-toluenesulfonic acid in ethanol as described in the preceding example. Crude 1,1 - diethoxy - 15-(2,6,6-trimethyl-1-cyclohexen-1-yl)-4,9,13 - trimethyl-2,4,8,10,12,14-pentadecahexaen-6-yne was obtained as a crystalline mass (U.V. absorption maxima at 386–388 and 404–406 m$\mu$ in petroleum ether) which was used in the next step without purification. (An aliquot recrystallized from ethanol formed yellow flakes, M.P. 87–88°.) 22 g. of the crude acetal were dissolved in 16 cc. of benzene and treated with 3 cc. of 10% zinc chloride-ethyl acetate solution. 4.7 g. of propenyl ethyl ether were added dropwise while stirring at a temperature of 30–35° and let stand for 15 hours. To hydrolyze the product, the crude 1,1,3-triethoxy-17-(2,6,6-trimethyl-1-cyclohexen - 1-yl) - 2,6,11,15-tetramethyl-4,6,10,12,14,16-heptadecahexaen-8-yne obtained was treated with a solution of 10 g. sodium acetate in 100 cc. of 95% acetic acid and heated with vigorous stirring in a nitrogen atmosphere for 4 hours at 95–100°. The benzene and the ethyl acetate formed distilled off slowly. The reaction mixture was permitted to cool and the crystalline reaction product was isolated and purified as in the preceding example. The 17 - (2,6,6 - trimethyl - 1-cyclohexen-1-yl)-2,6,11,15-tetramethyl - 2,4,6,10,12,14,16-heptadecaheptaen-8-yn-1-al was obtained as shiny red leaflets, M.P. 130.5°, U.V. absorption maximum at 431–432 m$\mu$ in petroleum ether.

*Example 7*

174 g. of 17-(2,6,6-trimethyl-1-cyclohexen-1-yl)-2,6,11, 15 - tetramethyl - 2,4,6,10,12,14,16 - heptadecaheptaen - 8-yn-1-al were suspended in 76.6 cc. of orthoformic acid ethyl ester, treated with a solution of 1.4 cc. of phosphoric acid and 0.1 g. p-toluenesulfonic acid in 35 cc. of absolute ethanol and stirred for five hours at 35° under an atmosphere of nitrogen. 100 cc. of absolute benzene were added at 35° and the mixture was stirred for an additional 40 hours. While cooling with ice, 10 cc. of pyridine and then 200 cc. of 5% sodium bicarbonate solution were added then extracted with ether. The ether extract was washed with water, dried with potassium carbonate and concentrated in vacuo. The residue was then dried at 40° under high vacuum. 1,1-diethoxy-17-(2,6,6-trimethyl - 1 - cyclohexen - 1-yl)-2,6,11,15-tetramethyl-2,4,6, 10,12,14,16-heptadecaheptaen-8-yne was obtained in the form of yellow plates. An aliquot of the crude product was recrystallized from ethanol; absorption maxima at 409 and 433 m$\mu$ ($E_1^1$=1845, 1590) in petroleum ether; M.P. 85 to 86°.

The crude product obtained above was dissolved in 150 cc. of absolute benzene. While stirring at 30°, 34 g. of vinyl ethyl ether and 25 cc. of a 10% solution of zinc chloride in ethyl acetate were simultaneously dropped in. Stirring was continued at room temperature under a nitrogen atmosphere for 16 hours. To the 1,1,3-triethoxy-19-(2,6,6 - trimethyl - 1 - cyclohexen - 1-yl)-4,8,13,17-tetramethyl-4,6,8,12,14,16,18-nonadecaheptaen-10-yne thus obtained was added a solution of 50 g. of sodium acetate in 500 cc. of 95% acetic acid and the mixture was heated for four hours at 95° in a nitrogen atmosphere while stirring. Upon cooling, the reaction mixture was taken up in methylene chloride, the methylene chloride extract was washed with a 5% sodium bicarbonate solution and with water, dried over sodium sulfate and concentrated in vacuo. The residue was recrystallized from high boiling petroleum ether. The 19-(2,6,6-trimethyl-1-cyclohexen - 1 - yl) - 4,8,13,17-tetramethyl-2,4,6,8,12,14,16,18-nonadecaoctaen-10-yn-1-al was obtained as red leaflets; M.P. 146 to 147°; absorption maximum at 447 m$\mu$ ($E_1^1$=2070) in petroleum ether.

10 g. of 19-(2,6,6-trimethyl-1-cyclohexen-1-yl)-4,8,13, 17-tetramethyl-2,4,6,8,12,14,16,18 - nonadecaoctaen - 10-yn-1-al were dissolved in 350 cc. of toluene. 3 g. of lead poisoned palladium-calcium carbonate catalyst and 0.3 cc. of quinoline were added. The mixture was agitated in a hydrogen atmosphere until the absorption of hydrogen ceased. The catalyst was filtered off and the filtrate was washed twice with 100 cc. portions of 0.5 N sulfuric acid, then with 100 cc. of 5% sodium bicarbonate solution and then with water. After drying with sodium sulfate, the solution was filtered and the filtrate was concentrated in vacuo at 30°. The residue, cis-19-(2,6,6-trimethyl-1-cyclohexen-1-yl)-4,8,13,17 - tetramethyl - 2,4, 6,8,10,12,14,16,18-nonadecanonaen-1-al, was taken up in 300 cc. of high boiling petroleum ether and heated to boiling in a nitrogen atmosphere for 4 hours. The solvent was evaporated in vacuo and the all-trans 19-(2,6,6-trimethyl-1-cyclohexen-1-yl)-4,8,13,17 - tetramethyl - 2,4, 6,8,10,12,14,16,18-nonadecanonaen-1-al was crystallized from benzene-ethanol in the form of violet crystals with a metallic sheen, M.P. 133 to 134°; absorption maximum at 473 mμ ($E_1^1$=2660) in petroleum ether.

*Example 8*

144 g. of 19-(2,6,6-trimethyl-1-cyclohexen-1-yl)-4,8,13,17-tetramethyl - 2,4,6,8,12,14,16,18 - nonadecaoctaen-10-yn-1-al were suspended in 65 cc. of orthoformic acid ethyl ester and, after the addition of a solution of 1.4 cc. of phosphoric acid and 0.1 g. of p-toluene sulfonic acid in 25 cc. of absolute ethanol, the suspension was heated at 40° in a nitrogen atmosphere while stirring. After 4 hours, 80 cc. of absolute benzene were added and after 20 hours an additional 100 cc. of absolute benzene were added. The mixture was stirred for an additional 24 hours at the same temperature. Then, while cooling with ice, 10 cc. of pyridine and 200 cc. of 5% sodium bicarbonate solution were added to the reaction mixture. The mixture was extracted with ether, the ether extract was washed with water, dried over potassium carbonate, evaporated in vacuo and then dried at 40° in a high vacuum. Yellow plates of 1,1-diethoxy-19-(2,6,6-trimethyl-1-cyclohexen-1-yl)-4,8,13,17 - tetramethyl - 2,4,6,8,12,14,16,18-nonadecaoctaen-10-yne were obtained and this material was used without further purification. [An aliquot was recrystallized from ethanol to obtain shiny yellow leaflets; M.P. 147 to 148°; absorption maxima at 424 and 452 mμ ($E_1^1$=1995, 1705) in petroleum ether.]

The crude product obtained above was dissolved in 300 cc. of methylene chloride. While stirring at 35°, 31 g. of propenyl ethyl ether and 22 cc. of a 10% solution of zinc chloride in ethyl acetate were dropped in simultaneously. Stirring was continued in a nitrogen atmosphere for 16 hours. To the crude 1,1,3-triethoxy-21-(2,6,6-trimethyl-1-cyclohexen - 1 - yl) - 2,6,10,15,19-pentamethyl - 4,6,8,10,14,16,18,20 - heneicosaoctaen-12-yne was added a solution of 75 g. of sodium acetate in 750 cc. of acetic acid. The mixture was heated while stirring in a current of nitrogen for 4 hours at 95°, whereupon benzene and ethyl acetate distilled off. After cooling, the mixture was taken up in methylene chloride, the methylene chloride extract was washed with 5% sodium bicarbonate solution and with water, dried over sodium sulfate and the solvent was distilled off in vacuo. The crude 21-(2,6,6-trimethyl-1-cyclohexen-1-yl)-2,6,10,15,19-pentamethyl - 2,4,6,8,10,14,16,18,20 - heneicosanonaen-12-yn-1-al thus obtained crystallized from high boiling petroleum ether in the form of red plates; M.P. 177 to 178°; absorption maximum at 458 mμ ($E_1^1$=2295) in petroleum ether.

9.0 g. 21-(2,6,6-trimethyl-1-cyclohexen-1-yl)-2,6,10,15,19-pentamethyl-2,4,6,8,10,14,16,18,20 - heneicosanonaen-12-yn-1-al were dissolved in 300 cc. of toluene. 4 g. of lead poisoned palladium-calcium carbonate catalyst and 0.4 cc. quinoline were added. The mixture was agitated in a hydrogen atmosphere until the absorption of hydrogen ceased. The procedure in Example 7 was followed to obtain cis-21-(2,6,6-trimethyl-1-cyclohexen-1-yl)-2,6,10,15,19-pentamethyl - 2,4,6,8,10,12,14,16,18,20 - heneicosadecaen-1-al. The last named compound was isomerized according to the procedure in Example 7 and all-trans-21-(2,6,6-trimethyl - 1 - cyclohexen-1-yl)-2,6,10,15,19-pentamethyl - 2,4,6,8,10,12,14,16,18,20 - heneicosadecaen-1-al was obtained as deep red leaflets, M.P. 146 to 147°; absorption maximum at 485 mμ ($E_1^1$=2660) in petroleum ether.

*Example 9*

24 cc. of orthoformic acid ethyl ester and a solution of 0.2 cc. phosphoric acid and 0.05 g. of p-toluene sulfonic acid in 12 cc. of absolute ethanol were added to 59 g. of 21-(2,6,6-trimethyl-1-cyclohexen-1-yl) - 2,6,10,15,19-pentamethyl-2,4,6,8,10,14,16,18,20 - heneicosanonaen-12-yn-1-al and the mixture was stirred at 40° in a nitrogen atmosphere. After 3 hours, 30 cc. of absolute benzene were added, after 10 hours an additional 30 cc. and after 24 hours still an additional 40 cc. of benzene were added and the stirring was continued at 40° for an additional 24 hours. While cooling with ice, 2 cc. of pyridine and 50 cc. of 5% sodium bicarbonate solution were added. After extracting the reaction product with methylene chloride, the extract was washed with water, dried with potassium carbonate, evaporated in vacuo and dried at 40° under high vacuum. The 1,1-diethoxy-21-(2,6,6-trimethyl-1-cyclohexen-1-yl)-2,6,10,15,19 - pentamethyl-2,4,6,8,10,14,16,18,20-heneicosanonaen-12-yne thus obtained was used in the next step without further purification. [An aliquot was crystallized from high boiling petroleum ether in the form of orange plates; M.P. 128 to 129°; absorption maxima at 442 and 470 mμ ($E_1^1$=2170, 1855) in petroleum ether.]

The crude product obtained above was dissolved in 90 cc. of methylene chloride. 10.0 g. of vinyl ethyl ether and 7.5 cc. of a 10% solution of zinc chloride in ethyl acetate were simultaneously added while stirring at 30°. After 15 hours, there was added to the 1,1,3-triethoxy-23-(2,6,6-trimethyl-1-cyclohexen-1-yl) - 4,8,12,17,21-pentamethyl - 4,6,8,10,12,16,18,20,22 - tricosanonaen-14-yne thus obtained a solution of 35 g. of sodium acetate in 350 cc. of acetic acid and the mixture was heated in a current of nitrogen at 95° while stirring. The reaction mixture was cooled after 4 hours and extracted with methylene chloride. The methylene chloride extract was washed with a 5% sodium bicarbonate solution and with water, dried with sodium sulfate and the solvent was evaporated in vacuo to obtain crude 23-(2,6,6-trimethyl-1-cyclohexen-1-yl)-4,8,12,17,21-pentamethyl - 2,4,6,8,10, 12,16,18,20,22-tricosadecaen-14-yn-1-al. The crude aldehyde was crystallized from benzene in the form of dark red plates, M.P. 170 to 171°; absorption maximum at 469 mμ ($E_1^1$=2570) in petroleum ether.

8.7 g. of 23-(2,6,6-trimethyl-1-cyclohexen-1-yl)-4,8,12,17,21-pentamethyl-2,4,6,8,10,12,16,18,20,22 - tricosadecaen-14-yn-1-al were dissolved in 300 cc. of toluene. 1.5 g. of lead poisoned palladium-calcium carbonate catalyst and 0.2 cc. quinoline were added. The mixture was agitated in a hydrogen atmosphere until the absorption of hydrogen ceased. The procedure in Example 7 was followed to obtain crude cis-23-(2,6,6-trimethyl-1-cyclohexen-1-yl)-4,8,12,17,21-pentamethyl - 2,4,6,8,10,12,14,16,18,20,22-tricosaundecaen-1-al; absorption maxima at 383 and 494 mμ in petroleum ether. This product was dissolved in 300 cc. petroleum ether of high boiling point and heated to boiling in a nitrogen atmosphere for 4 hours. The solvent was distilled off in vacuo and the residue dissolved in 200 cc. of low boiling petroleum ether. This solution was agitated 1 hour at room temperature and filtered to obtain crude all-trans-23-(2,6,6,-trimethyl-1-cyclohexen-1-yl)-4,8,12,17,21-pentamethyl-2,4,6,8,10,12,14,-16,18,20,22-tricosaundecaen-1-al. This product was crystallized from high boiling petroleum ether in the form of violet crystals of metallic sheen, M.P. 160–161°; absorption maximum at 498 mμ ($E_1^1$=2730) in petroleum ether.

*Example 10*

To 40 g. of 23-(2,6,6-trimethyl-1-cyclohexen-1-yl)-4,8,12,17,21-pnetamethyl-2,4,6,8,10,12,16,18,20,22-tricosadecaen-14-yn-1-al were added 16 cc. of orthoformic acid ethyl ester and a solution of 0.2 cc. of phosphoric acid and 0.05 g. of p-toluene sulfonic acid in 8 cc. of absolute ethanol. The mixture was stirred at 40° in a nitrogen atmosphere for 3 hours. 30 cc. of absolute benzene were then added and after an additional 20 hours 50 cc. more of benzene were added. After 48 hours 3 cc. of pyridine and then 50 cc. of a 5% sodium bicarbonate solution were added while cooling with ice. The reaction product was taken up in methylene chloride, the methylene chloride extract was washed with water and dried with potassium carbonate. The solvent was evaporated in vacuo and the residue was dried at 40° under high vacuum. 1,1-diethoxy-23-(2,6,6-trimethyl-1-cyclohexen-1-yl)-4,8,12,17,21-pentamethyl-2,4,6,8,10,12,16,18,20,22-tricosadecaen-14-yne was obtained as a crystalline residue which was

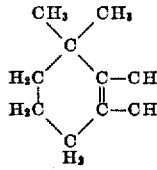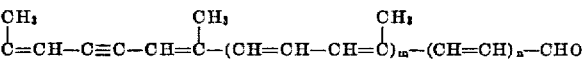

used in the next step without further purification. [An aliquot was recrystallized in pure form from benzene as red leaflets, M.P. 162 to 164°; absorption maxima at 454 and 483 mμ ($E_1^1$=2435, 1985) in petroleum ether.]

The crude product obtained above was dissolved in 60 cc. of methylene chloride. While stirring at 35°, 7.5 g. of propenyl ethyl ether and 6 cc. of a 10% solution of zinc chloride in ethyl acetate were simultaneously added. Stirring was continued for 16 hours in a nitrogen atmosphere. A solution of 30 g. of sodium acetate in 300 cc. of 95% acetic acid was added to the resulting crude 1,1,3-triethoxy-25-(2,6,6-trimethyl-1-cyclohexen-1-yl)-2,6,10,14,19,23-hexamethyl-4,6,8,10,12,14,18,20,22,24-pentacosadecaen-16-yne and the mixture was heated at 95° under nitrogen whereupon methylene chloride and ethyl acetate distilled off. The reaction mixture was cooled to room temperature after 4 hours. The mixture was extracted with methylene chloride, the methylene chloride extract was washed with a 5% sodium bicarbonate solution and with water, dried with sodium sulfate and the solvent was evaporated in vacuo. The crude 25-(2,6,6-trimethyl-1-cyclohexen-1-yl)-2,6,10,14,19,23-hexamethyl-2,4,6,8,10,12,14,18,20,22,24-pentacosaundecaen-16-yn-1-al thus obtained was recrystallized from benzene in the form of dark red leaflets, M.P. 178 to 180°; absorption maximum at 480 mμ ($E_1^1$=2700) in petroleum ether.

10 g. of 25-(2,6,6-trimethyl-1-cyclohexen-1-yl)-2,6,10,14,19,23-hexamethyl-2,4,6,8,10,12,14,18,20,22,24-pentacosaundecaen-16-yn-1-al were dissolved in 350 cc. of toluene. After the addition of 3 g. of lead poisoned palladium-calcium carbonate catalyst and 0.3 cc. of quinoline, the mixture was agitated in a hydrogen atmosphere until absorption of hydrogen ceased. The catalyst was separated by filtration. The filtrate was washed twice with 100 cc. portions of 0.5 N sulfuric acid, with 5% sodium bicarbonate solution and with water. After drying over sodium sulfate and filtering, the filtrate was concentrated in vacuo at 30° to obtain crude cis-25-(2,6,6-trimethyl-1-cyclohexen-1-yl)-2,6,10,14,19,23-hexamethyl-2,4,6,8,10,12,14,16,18,20,22,24-pentacosadedecaen-1-al; absorption maxima at 399–401 and 505 mμ in petroleum ether. The last named compound was dissolved in 300 cc. of high boiling petroleum ether and heated to boiling in a nitrogen atmosphere for 4 hours. The solvent was evaporated in vacuo to obtain crude all-trans-25-(2,6,6,-trimethyl-1-cyclohexen-1-yl)-2,6,10,14,19,23-hexamethyl-2,4,6,8,10,12,14,16,18,20,22,24-pentacosadodecaen-1-al, which was then crystallized from benzene in the form of violet leaflets with a metallic sheen, M.P. 170 to 172°; absorption maximum at 508–509 mμ in petroleum ether.

This application is a continuation-in-part of application Serial No. 767,271, filed October 15, 1958, and now abandoned, with respect to the subject matter of said application 767,271, and is a continuation-in-part of application Serial No. 767,278, filed October 15, 1958, and now abandoned, with respect to the subject matter of said application 767,278.

We claim:

1. A compound of the formula wherein m represents an integer from 0 to 3 and n represents an integer from 0 to 1.

2. 13-(2,6,6-trimethyl-1-cyclohexen-1-yl)-2,7,11-trimethyl-2,6,8,10,12-tridecapentaen-4-yn-1-al.

3. 15-(2,6,6-trimethyl-1-cyclohexen-1-yl)-4,9,13-trimethyl-2,4,8,10,12,14-pentadecahexaen-6-yn-1-al.

4. 17-(2,6,6-trimethyl-1-cyclohexen-1-yl)-2,6,11,15-tetramethyl-2,4,6,10,12,14,16-heptadecaheptaen-8-yn-1-al.

5. 19-(2,6,6-trimethyl-1-cyclohexen-1-yl)-4,8,13,17-tetramethyl-2,4,6,8,12,14,16,18-nonadecaoctaen-10-yn-1-al.

6. 21-(2,6,6-trimethyl-1-cyclohexen-1-yl)-2,6,10,15,19-pentamethyl-2,4,6,8,10,14,16,18,20-heneicosanonaen-12-yn-1-al.

7. 23-(2,6,6-trimethyl-1-cyclohexen-1-yl)-4,8,12,17,21-pentamethyl-2,4,6,8,10,12,16,18,20,22-tricosadecaen-14-yn-1-al.

8. 25-(2,6,6-trimethyl-1-cyclohexen-1-yl)-2,6,10,14,19,23-hexamethyl-2,4,6,8,10,12,14,18,20,22,24-pentacosaundecaen-16-yn-1-al.

9. A compound of the formula

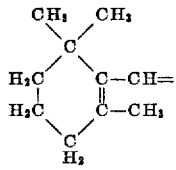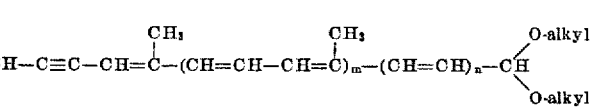

wherein m represents an integer from 0 to 3 and n represents an integer from 0 to 1, and alkyl is selected from the group consisting of straight chain aliphatic hydrocarbon groups and branched chain aliphatic hydrocarbon groups.

10. 1,1-dilower alkoxy-13-(2,6,6-trimethyl-1-cyclohexen-1-yl)-2,7,11-trimethyl-2,6,8,10,12-tridecapentaen-4-yne.

11. 1,1-dilower alkoxy-15-(2,6,6-trimethyl-1-cyclohexen-1-yl)-4,9,13-trimethyl-2,4,8,10,12,14-pentadecahexaen-6-yne.

12. A process which comprises condensing 1,1-dilower alkoxy-2-methyl-2-penten-4-yne with 8-(2,6,6-trimethyl-1-cyclohexen-1-yl)-2,6-dimethyl-2,4,6-octatrien-1-al in a metallo organic reaction by means of alkyl metal halide and hydrolyzing the condensation product with aqueous acid to obtain 1,1-dilower alkoxy-13-(2,6,6-trimethyl-1-cyclohexen-1-yl)-2,7,11-trimethyl-6-hydroxy-2,7,9,11-tridecatetraen-4-yne.

13. 1-lower alkoxy-13-(2,6,6-trimethyl-1-cyclohexen-1-yl)-2,7,11-trimethyl-1,7,9,11-tridecatetraen-4-yn-3,6-diol.

14. 1-isopropoxy-13-(2,6,6-trimethyl-1-cyclohexen-1-yl)-2,7,11-trimethyl-1,7,9,11-tridecatetraen-4-yn-3,6-diol.

15. 1-acyloxy-13-(2,6,6-trimethyl-1-cyclohexen-1-yl)-2,7,11-trimethyl-1,7,9,11-tridecatetraen-4-yn-3,6-diol wherein the term acyl represents an acid group obtained upon removal of the hydroxy group from an acid selected from the group consisting of alkanoic and aralkanoic acids.

16. 1-benzoyloxy-13-(2,6,6-trimethyl-1-cyclohexen-1-yl)-2,7,11-trimethyl-1,7,9,11-tridecatetraen-4-yn-3,6-diol.

17. 1,1 - dilower alkoxy - 13 - (2,6,6 - trimethyl - 1-cyclohexen - 1 - yl) - 2,7,11 - trimethyl - 6 - hydroxy - 2,7,9,11-tridecatetraen-4-yne.

18. 1,1 - diethoxy - 13 - (2,6,6 - trimethyl - 1 - cyclohexen - 1 - yl) - 2,7,11 - trimethyl - 6 - hydroxy - 2,7,9,11-tridecatetraen-4-yne.

19. 1-lower alkoxy-2-methyl-3-hydroxy-1-penten-4-yne.

20. 1 - isopropoxy - 2 - methyl - 3 - hydroxy - 1 - penten-4-yne.

21. 1,1-dilower alkoxy-2-methyl-2-penten-4-yne.

22. 1,1-diethoxy-2-methyl-2-penten-4-yne.

23. A process which comprises reacting 1-lower alkoxy-2-methyl-3-hydroxy-1-penten-4-yne with orthoformic acid alkyl ester in the presence of an acid catalyst selected from the group consisting of mineral acids and arylsulfonic acids to obtain 1,1-dilower alkoxy-2-methyl-2-penten-4-yne.

24. 19 - (2,6,6 - trimethyl - 1 - cyclohexen - 1 - yl)-4,8,13,17 - tetramethyl - 2,4,6,8,10,12,14,16,18 - nonadecanonaen-1-al.

25. 21 - (2,6,6 - trimethyl - 1 - cyclohexen - 1 - yl)-2,6,10,15,19 - pentamethyl - 2,4,6,8,10,12,14,16,18,20-heneicosadecaen-1-al.

26. 23 - (2,6,6 - trimethyl - 1 - cyclohexen - 1 - yl)- 4,8,12,17,21 - pentamethyl - 2,4,6,8,10,12,14,16,18,20,22-tricosaundecaen-1-al.

27. 25 - (2,6,6 - trimethyl - 1 - cyclohexen - 1 - yl)-2,6,10,14,19,23 - hexamethyl - 2,4,6,8,10,12,14,16,18,20,22,24-pentacosadodecaen-1-al.

References Cited in the file of this patent
UNITED STATES PATENTS

| | | |
|---|---|---|
| 1,902,070 | Halbig et al. | Mar. 21, 1933 |
| 2,369,168 | Milas | Feb. 13, 1945 |
| 2,451,736 | Isler | Oct. 19, 1948 |
| 2,657,219 | Isler et al. | Oct. 27, 1953 |
| 2,676,992 | Humphlett | Apr. 27, 1954 |
| 2,676,994 | Burness et al. | Apr. 27, 1954 |
| 2,809,217 | Inhoffen et al. | Oct. 8, 1957 |
| 2,810,761 | Wheeler | Oct. 22, 1957 |
| 2,811,561 | Fletcher | Oct. 29, 1957 |

FOREIGN PATENTS

| | | |
|---|---|---|
| 774,462 | Great Britain | May 8, 1957 |
| 1,031,777 | Germany | June 12, 1958 |

OTHER REFERENCES

Karrer et al.: "Carotenoids," pages 144, 145, Elsevier Publ. Co. (1950).

UNITED STATES PATENT OFFICE
CERTIFICATE OF CORRECTION

Patent No. 3,091,631                                        May 28, 1963

Otto Isler et al.

It is hereby certified that error appears in the above numbered patent requiring correction and that the said Letters Patent should read as corrected below.

Column 2, line 14, for "12-(2,6,6-" read -- 23-(2,6,6- --; line 32, for "-4-pn-" read -- -4-yn- --; same line 32, for "1-alkoxy-12-" read -- 1-alkoxy-13- --; column 3, line 3, for "atoms" read -- atom --; column 12, line 63, for "-pnetamethyl-" read -- -pentamethyl- --; column 13, line 60, for "-pentacosadedecaen-" read -- -pentacosadodecaen- --.

Signed and sealed this 3rd day of December 1963.

(SEAL)
Attest:

ERNEST W. SWIDER

Attesting Officer

EDWIN L. REYNOLDS

Acting Commissioner of Patents